United States Patent
Hashi

(10) Patent No.: US 9,866,808 B2
(45) Date of Patent: Jan. 9, 2018

(54) PROJECTOR SYSTEM FOR ARRANGING AN IMAGE WITHIN A PROJECTION RANGE

(71) Applicant: Panasonic Intellectual Property Management Co., Ltd., Osaka (JP)

(72) Inventor: Hideyuki Hashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/334,525

(22) Filed: Oct. 26, 2016

(65) Prior Publication Data

US 2017/0134702 A1  May 11, 2017

(30) Foreign Application Priority Data

Nov. 10, 2015 (JP) ................................ 2015-220029
Oct. 13, 2016 (JP) ................................ 2016-201711

(51) Int. Cl.
G03B 21/28 (2006.01)
H04N 9/31 (2006.01)
G02B 26/08 (2006.01)

(52) U.S. Cl.
CPC ....... H04N 9/3185 (2013.01); G02B 26/0816 (2013.01); G03B 21/28 (2013.01)

(58) Field of Classification Search
CPC ....... G03B 21/28; G03B 21/30; G03B 21/145
See application file for complete search history.

(56) References Cited

U.S. PATENT DOCUMENTS

| 7,789,516 B2* | 9/2010 | Lee .................. G03B 21/28 348/781 |
| 2002/0122161 A1 | 9/2002 | Nishida et al. |
| 2005/0024598 A1 | 2/2005 | Inoue |
| 2010/0165308 A1* | 7/2010 | Morikuni ............ G03B 21/145 353/98 |
| 2011/0188007 A1* | 8/2011 | Okura .................. G03B 21/10 353/77 |
| 2012/0236266 A1 | 9/2012 | Takahashi et al. |

FOREIGN PATENT DOCUMENTS

| JP | 5-224296 | 9/1993 |
| JP | 2002-262198 | 9/2002 |
| JP | 2005-051577 | 2/2005 |
| JP | 2012-209927 | 10/2012 |
| JP | 2015-031932 | 2/2015 |

* cited by examiner

Primary Examiner — Sultan Chowdhury
(74) Attorney, Agent, or Firm — Wenderoth, Lind & Ponack, L.L.P.

(57) ABSTRACT

The projector system of the present disclosure has a projector, a mirror, an angle detector, and a calculator. The projector projects an image. The mirror tilts each of on intersecting two axes as an axis of rotation and reflects the image projected from the projector. The angle detector detects an inclination angle of the mirror. Based on the inclination angle, the calculator calculates a reflection-possible range of the mirror, a projection-possible range of the projector that corresponds to the reflection-possible range, and an image range so that the image is arranged within the projection-possible range.

9 Claims, 17 Drawing Sheets

PROJECTOR SYSTEM FOR ARRANGING AN IMAGE WITHIN A PROJECTION RANGE

BACKGROUND

1. Technical Field

The present disclosure relates to a projector system capable of changing a projecting direction of projection image by a mirror and projecting the projection image extensively in directions.

2. Description of the Related Art

A conventional projector system changes a projecting direction of projection image by a mirror and provides the projection image with distortion correction (see Patent Literature 1, for example).

CITATION LIST

Patent Literature

PTL 1: Japanese Unexamined Patent Application Publication No. 2002-262198

SUMMARY

Although the conventional structure above allows a projection image having undergone change in projecting direction by a mirror to have distortion correction, it does not allow the mirror to have inclination insomuch that an area where image is not reflected appears. Therefore, the structure fails to project projection image extensively in directions. To project projection image extensively in directions by expanding a range of the inclination angle of the mirror, the structure needs a large-sized mirror.

The present disclosure addresses the problems in the conventional structure above. It provides a projector system capable of projecting image extensively in directions with no need for a large-sized mirror.

To address the problems above, the projector system of the present disclosure has a projector, a mirror, an angle detector, and a calculator. The projector projects an image. The mirror tilts each of on intersecting two axes as an axis of rotation and reflects the image projected from the projector. The angle detector detects an inclination angle of the mirror. Based on the inclination angle, the calculator calculates a reflection-possible range of the mirror, a projection-possible range of the projector that corresponds to the reflection-possible range, and an image range so that the image is arranged within the projection-possible range.

With the structure above, a reflection-possible range of the mirror is obtained in advance. This allows projection image to be projected extensively in directions with no need for a large-sized mirror.

DETAILED DESCRIPTION

Hereinafter, an exemplary embodiment will be described in detail, with reference to the accompanying drawings. However, details beyond necessity (for example, descriptions on well-known matters or on substantially identical structures) may be omitted to eliminate redundancy from the description below for easy understanding of those skilled in the art.

It is to be understood that the accompanying drawings and the description below are for purposes of full understanding of those skilled in the art and are not to be construed as limitation on the scope of the claimed disclosure.

First Exemplary Embodiment

Figure 1:
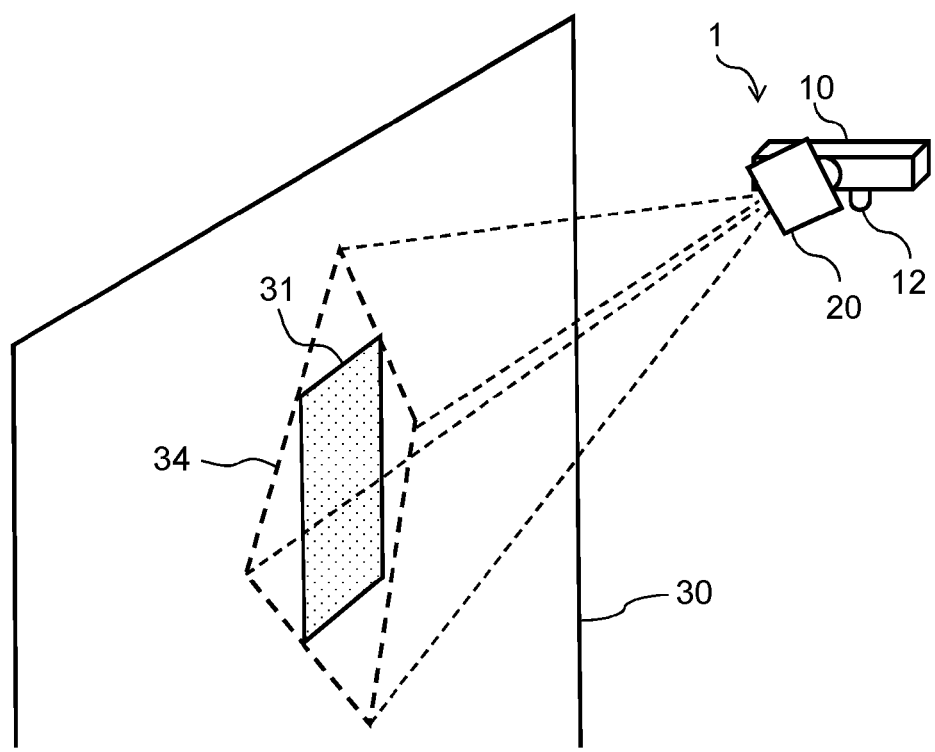
FIG. 1 is a schematic view showing the projector system in accordance with a first exemplary embodiment.

FIG. 1 is a schematic view showing projector system 1 in accordance with the first exemplary embodiment. As shown in FIG. 1, projector system 1 is formed of projector apparatus 10 and mirror 20. Projector apparatus 10 projects an image of a rectangular shape onto projection plane 30. Mirror 20, which is disposed in the projecting direction of projector apparatus 10, is tiltable on intersecting two axes as a rotation axis. According to projector system 1, receiving an image projected from projector apparatus 10, tiltable mirror 20 reflects it off so as to change the projecting direction of the image. Projector system 1 projects the image onto projection plane 30 located in the direction in which mirror 20 changes the projecting direction of the image. Projector apparatus 10 detects position data on projection plane 30 at position detector 12. Based on an inclination angle of mirror 20 and the position data on projection plane 30, projector apparatus 10 corrects an image to be projected onto projection plane 30 so that image range 31 for projection image is maximized as a rectangular shape within projection-possible range 34.

Figure 2:
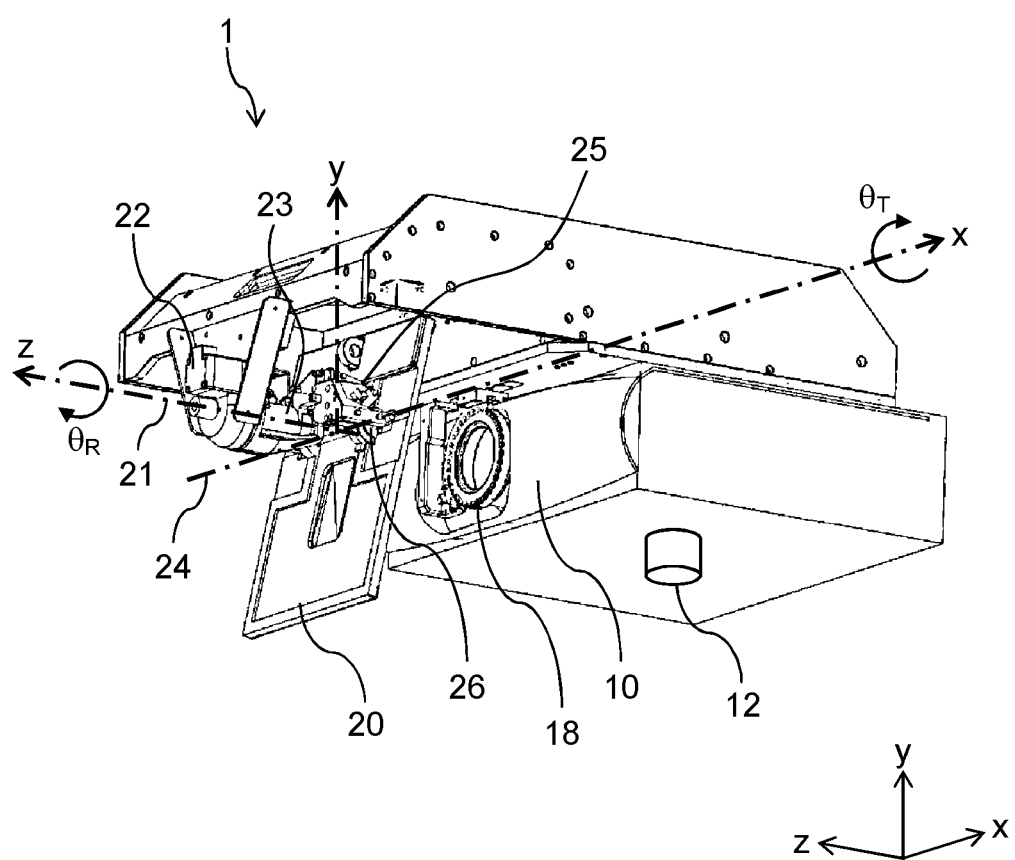
FIG. 2 is a detail view showing a projector apparatus and a mirror in accordance with the first exemplary embodiment.

FIG. 2 is a detail view showing projector apparatus 10 and mirror 20 of the first exemplary embodiment. As shown in FIG. 2, the direction along the optical axis of the projection lens of projector apparatus 10 is defined as the z-axis, the horizontal direction perpendicular to the z-axis is defined as the x-axis, and the direction perpendicular to both the z-axis and the x-axis is defined as the y-axis. Mirror 20 rotates (tilts) on each of the z-axis and the x-axis as a rotation axis. Front plane 18 of projector apparatus 10, which is parallel to the x-y plane, is the plane in which projection range 19 (that will be described later) is defined (see FIG. 4).

As shown in FIG. 2, mirror 20 rotates on roll rotation shaft 21 along the z-axis. The rotation of mirror 20 on the z-axis is driven by roll stepper motor 22 via roll bearing 23. Mirror 20 also rotates on tilt rotation shaft 24 along the x-axis. The rotation of mirror 20 on the x-axis is driven by tilt stepper motor 25 via tilt bearing 26. Roll bearing 23 and tilt bearing 26 are fastened to each other. Tilt rotation shaft 24 is fastened on tilt bearing 26. The structure allows mirror 20 to have not only a roll movement on roll rotation shaft 21 but also a tilt movement on tilt rotation shaft 24.

In the structure above, roll stepper motor 22 and roll bearing 23 work as a z-axis angle-controller (mirror driver) that moves mirror 20 on the z-axis to change the inclination angle of mirror 20. Similarly, tilt stepper motor 25 and tilt bearing 26 work as an x-axis angle-controller (mirror driver) that moves mirror 20 on the x-axis to change the inclination angle of mirror 20. The angle controllers can continuously work by each stepper motor.

By detecting steps produced by roll stepper motor 22 and tilt stepper motor 25, roll-movement angle $\theta R$ and tilt-movement angle $\theta T$ are detected on a real-time basis. That is, roll stepper motor 22 and tilt stepper motor 25 also work as an angle detector that detects the inclination angle of mirror 20. Roll stepper motor 22 and tilt stepper motor 25 double as an angle controller and an angle detector, which means that, when they continuously work, the inclination angle of the mirror can be continuously detected.

Upon the power ON of the projector system, roll-movement angle $\theta R$ and tilt-movement angle $\theta T$ are measured by photo sensor 27 (FIG. 3) disposed close to roll bearing 23 and tilt bearing 26. Based on the measurement result of photo sensor 27 and a rotation angle of the stepper motors, the inclination angle of mirror 20 is detected on a steady basis. As another possibility, the projector system, upon its power ON, may perform reference-point adjustment where the inclination angle of mirror 20 is set to 0°.

As for roll-movement angle $\theta R$, when the short sides of mirror 20 are parallel and horizontal to the x-axis, roll-movement angle $\theta R$ is defined as 0°, and as shown in FIG. 2, the rotation on the z-axis shown by an arrow (i.e., the rotation counterclockwise to the z-axis) is defined as the positive-direction rotation. As for tilt-movement angle $\theta T$, when the normal direction of the reflection surface of mirror 20 agrees with the negative direction of the z-axis, tilt-movement angle $\theta T$ is defined as 0°, and the rotation on the x-axis shown by an arrow in FIG. 2 (i.e., the rotation counterclockwise to the x-axis) is defined as the positive-direction rotation.

Figure 3:
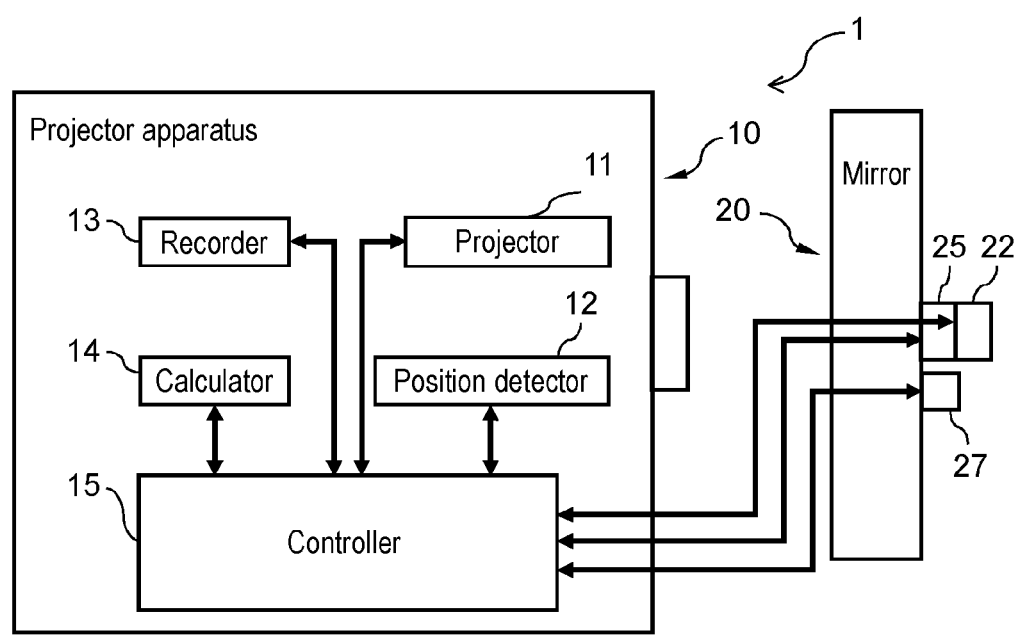
FIG. 3 is a block diagram of the projector apparatus in accordance with the first exemplary embodiment.

FIG. 3 is a block diagram of projector system 1 of the first exemplary embodiment. As shown in FIG. 3, projector apparatus 10 is formed of projector 11, position detector 12, recorder 13, calculator 14, and controller 15.

Projector 11 converts image signals into an image to be projected, and projects the projection image, via mirror 20, onto projection plane 30.

Position detector 12 detects, without via mirror 20, position data on projection plane 30 on which the projection image is shown. Specifically, the position data includes a distance between projector apparatus 10 and projection plane 30, and an angle formed by projection plane 30 and the optical axis of projector apparatus 10 (i.e., the z-axis). Position detector 12, as shown in FIG. 1 and FIG. 2, is attached on the lower surface of projector apparatus 10. Position detector 12 may serve as a receiver that receives position data on projection plane 30 from a projection-plane detector disposed on an appropriate position.

Recorder 13 records position data on projector apparatus 10, mirror 20, and projection plane 30 to which projection image is projected from the place at which projector apparatus 10 is disposed. Recorder 13 also records calculation results of calculator 14 and input data other than the position data.

Based on the inclination angle of mirror 20, calculator 14 calculates a reflection-possible range of mirror 20, and then calculates a projection-possible range of projector 11. Further, calculator 14 calculates image range 31 in which entire region of the image to be projected to the projection-possible range is arranged. Calculator 14 calculates image range 31 and produces image to be projected by projector 11 of projector apparatus 10 onto image range 31. In the calculation above, according to the position data on projection plane 30 detected by position detector 12, calculator 14 determines image range 31 so as to have the maximum size as a predetermined shape (a rectangular shape) within the projection-possible range on projection plane 30.

Besides, based on the position data stored in recorder 13, calculator 14 may calculate rectangular image range 31 of a maximum size. For example, when the position of projection image is changed by a continuous operation of mirror 20 driven by roll stepper motor 22 and tilt stepper motor 25, calculator 14 calculates image range 31 based on the continuously recorded position data stored in recorder 13, so that image range 31 can change a projecting position while keeping the maximum size.

Controller 15 controls recorder 13 and calculator 14, based on the data on the inclination angle of mirror 20 received from roll stepper motor 22, tilt stepper motor 25, and photo sensor 27. Controller 15 produces an image of a maximized size so as to fit into image range 31 and requests projector 11 to project the image.

Figure 4:
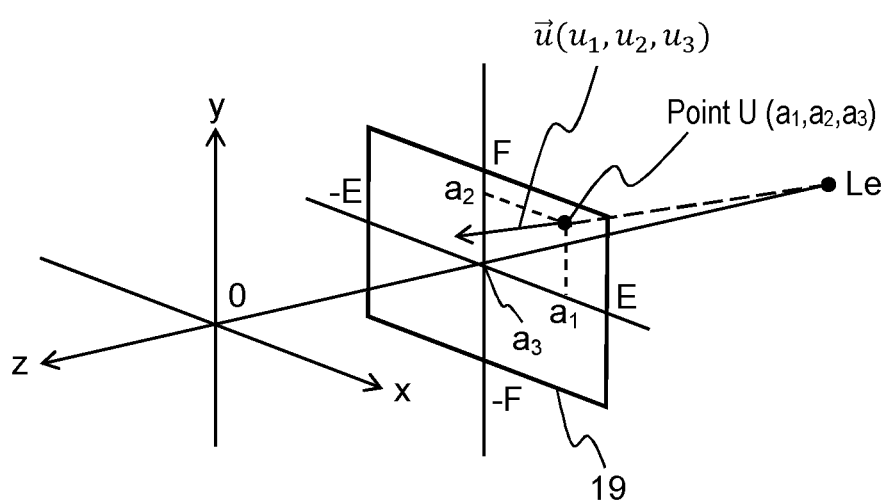
FIG. 4 shows coordinates on a projection side of the main body of the projector apparatus in accordance with the first exemplary embodiment.

Next, the method for projecting the projection image from projector apparatus 10 will be described. FIG. 4 shows coordinates on the projection side of the main body of projector apparatus 10 of the first exemplary embodiment.

In FIG. 4, rectangular projection range 19 on the plane (z=a3) of front plane 18 of projector apparatus 10 contains from −E to E in the x-axis direction and from −F to F in the y-axis direction. As shown in FIG. 4, suppose that the starting point of projection is defined as entrance pupil Le, an arbitrary point in projection range 19 is defined as point U (a1, a2, a3), and a projecting direction is defined as projection vector u (u1, u2, u3).

Figure 5:
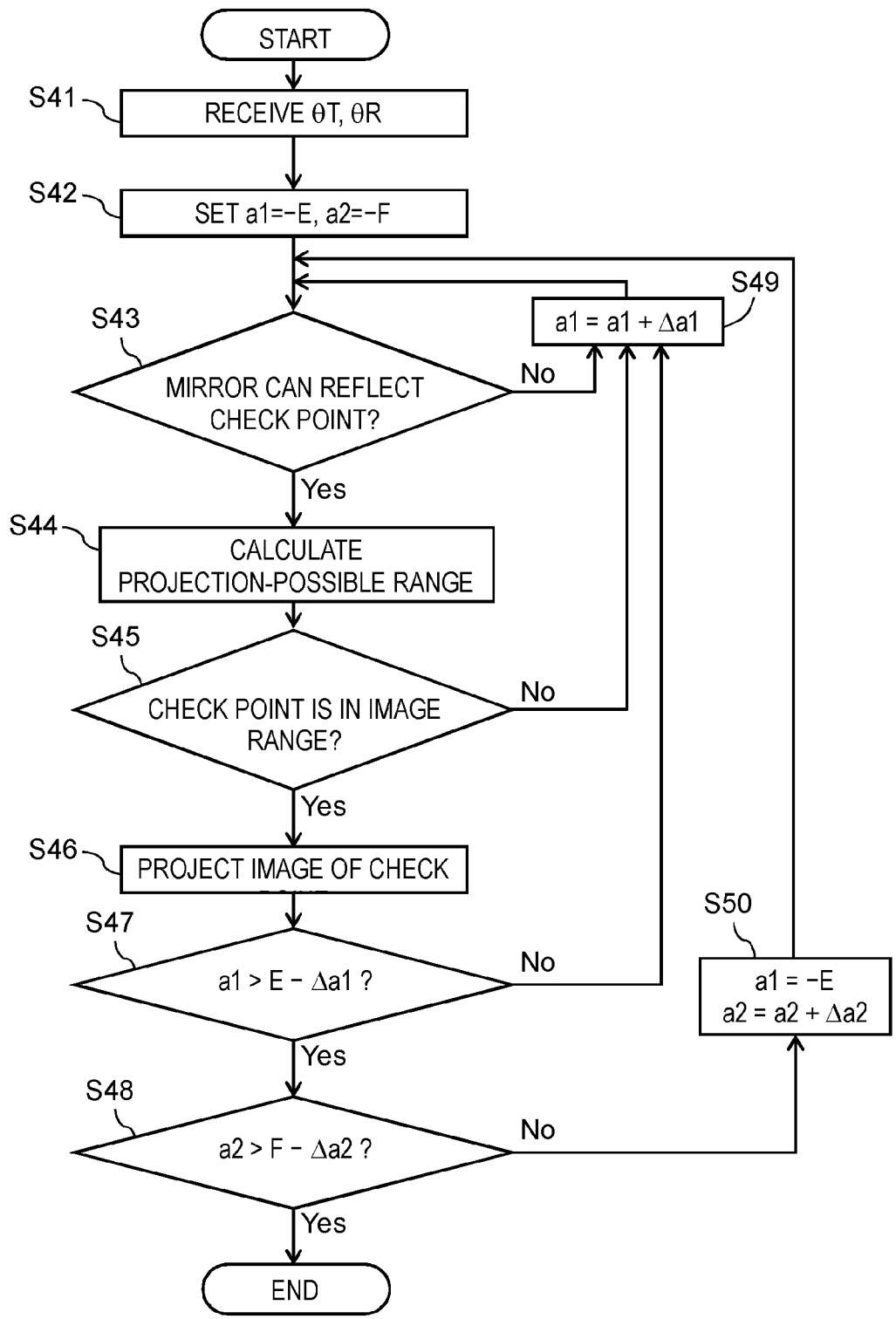
FIG. 5 is a flowchart illustrating the projection procedures of the projector system in accordance with the first exemplary embodiment.

Whether an image positioned at point U (a1, a2, a3) in projection range 19 is projected or not is determined by the flowchart of FIG. 5. FIG. 5 is the flowchart illustrating the projection procedures of projector system 1 of the first exemplary embodiment.

First, in step S41, controller 15 of projector apparatus 10 receives roll-movement angle θR and tilt-movement angle θT (of the inclination angle of mirror 20) from roll stepper motor 22 and tilt stepper motor 25, respectively. To determine whether image projection over the entire area of projection range 19 is performed or not, controller 15 moves point U by check increment Δa1 in the x-axis direction and by check increment Δa2 in the y-axis direction, and checks currently-positioned point U each time as the check point. In step S42, as the first check point, point U (a1, a2) is set to (−E, −F) at the bottom left corner of projection range 19 of FIG. 4. Next, in step S43, controller 15 checks whether or not the check point satisfies a first condition that the check point can be reflected by mirror 20. The determination is based on calculation of tilt-movement angle θT and roll-movement angle θR by calculator 14. The first condition will be described later in detail.

If the check point can be reflected by mirror 20 in step S43 (i.e., in the case of 'Yes' in S43), in the next step S44, controller 15 requests calculator 14 to calculate normal vector h and coordinate data point H on projection plane 30 detected by position detector 12. Further, controller 15 requests calculator 14 to calculate a projection-possible range based on tilt-movement angle θT, roll-movement angle θR, normal vector h, and coordinate data point H. Controller 15 obtains, from position detector 12 or a projection plane detector disposed on a predetermined position, the distance between projection plane 30 and projector apparatus 10 and the angle which projector apparatus 10 makes with projection plane 30.

In step S45, controller 15 checks whether or not the check point satisfies a second condition that the check point is projected within image range 31 on projection plane 30. The second condition will be described later in detail.

In step S45, when controller 15 determines that the check point is projected within image range 31 (i.e., in the case of Yes' in S45), the image of the check point is projected in step S46. In step S47, controller 15 compares x-coordinate value a1 of the check point to E−Δa1.

In step S47, when controller 15 determines that x-coordinate value a1 of the check point is greater than E−Δa1 (i.e., in the case of 'Yes' in S47), in step S48, controller 15 further compares y-coordinate value a2 of the check point to F−Δ2.

In step S48, when controller 15 determines that y-coordinate value a2 of the check point is greater than F−Δa2 (i.e., in the case of 'Yes' in S48), the procedure goes to END.

In the case of 'No' in step S43, step S45, and step S47, check increment Δa1 is added to x-coordinate value a1 of the check point in step S49, and the procedure goes back to step S43. In the case of 'No' in step S48, x-coordinate value a1 is reset to −E and check increment Δa2 is added to y-coordinate value a2 of the check point in step S50, and the procedure goes back to step S43. In this way, all the check points within projection range 19 are checked by carrying out the routine.

Figure 6:
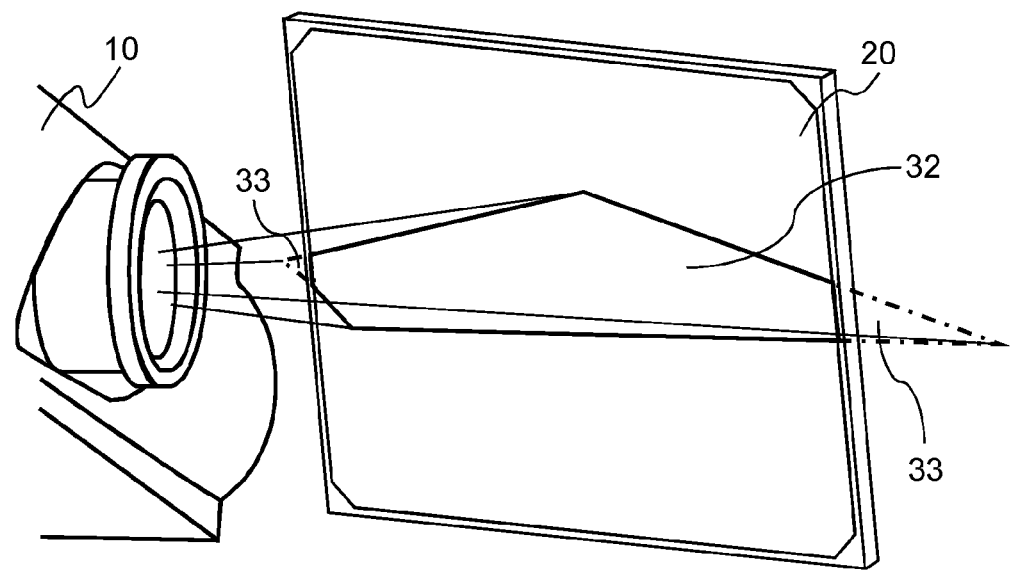
FIG. 6 shows a reflection range of the mirror in accordance with the first exemplary embodiment.
Figure 7:
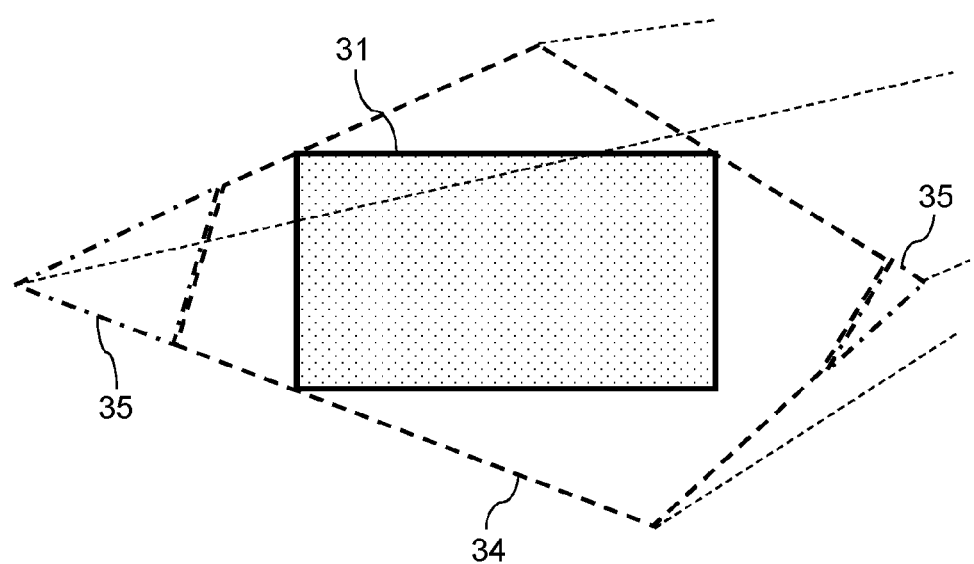
FIG. 7 shows projection possible range of a projection plane on which projection image is to be projected in accordance with the first exemplary embodiment.

FIG. 6 shows a reflection range of the mirror of the first exemplary embodiment. FIG. 7 shows a projection-possible range on the projection plane of the first exemplary embodiment.

FIG. 6 shows a state in which the area in projection range 19 that is not reflected by mirror 20 becomes larger. To be specific, at that time, mirror 20 rotates on roll rotation shaft 21, diagonal opposite corners of projection range 19 are located parallel to the long sides or the short sides of mirror 20, and mirror 20 has large tilt-movement angle θT. In the state above, the area that is reflected by mirror 20 (i.e., reflection range 32) and the area that is not reflected by mirror 20 (i.e., non-reflection range 33) in FIG. 6 correspond to the area that is projected onto projection plane 30 (i.e., projection-possible range 34) and the area that is not projected onto projection plane (i.e., projection-impossible range 35) in FIG. 7, respectively. That is, in projector system 1, the area that is reflected by mirror 20 with various inclination angles corresponds to reflection range 32 of FIG. 6, and the area in projection plane 30 corresponds to reflection range 32 is projection-possible range 34 of FIG. 7. Calculator 14 calculates the area of projection range 19, which corresponds to reflection range 32 of mirror 20 and projection-possible range 34 in projection plane 30, and calculates image range 31—in which images are arranged—in projection-possible range 34.

Detecting non-reflection range 33 (i.e., the area that is not reflected by mirror 20) in advance so that no image is arranged therein is effective in that mirror 20 reflects all the images projected by projector apparatus 10 without employing a large sized mirror. Further, suppressing floodlight to non-reflection range 33 not only contributes to low power consumption, but also protects viewers' eyes from an adverse effect caused by looking floodlight directly.

Figure 8:
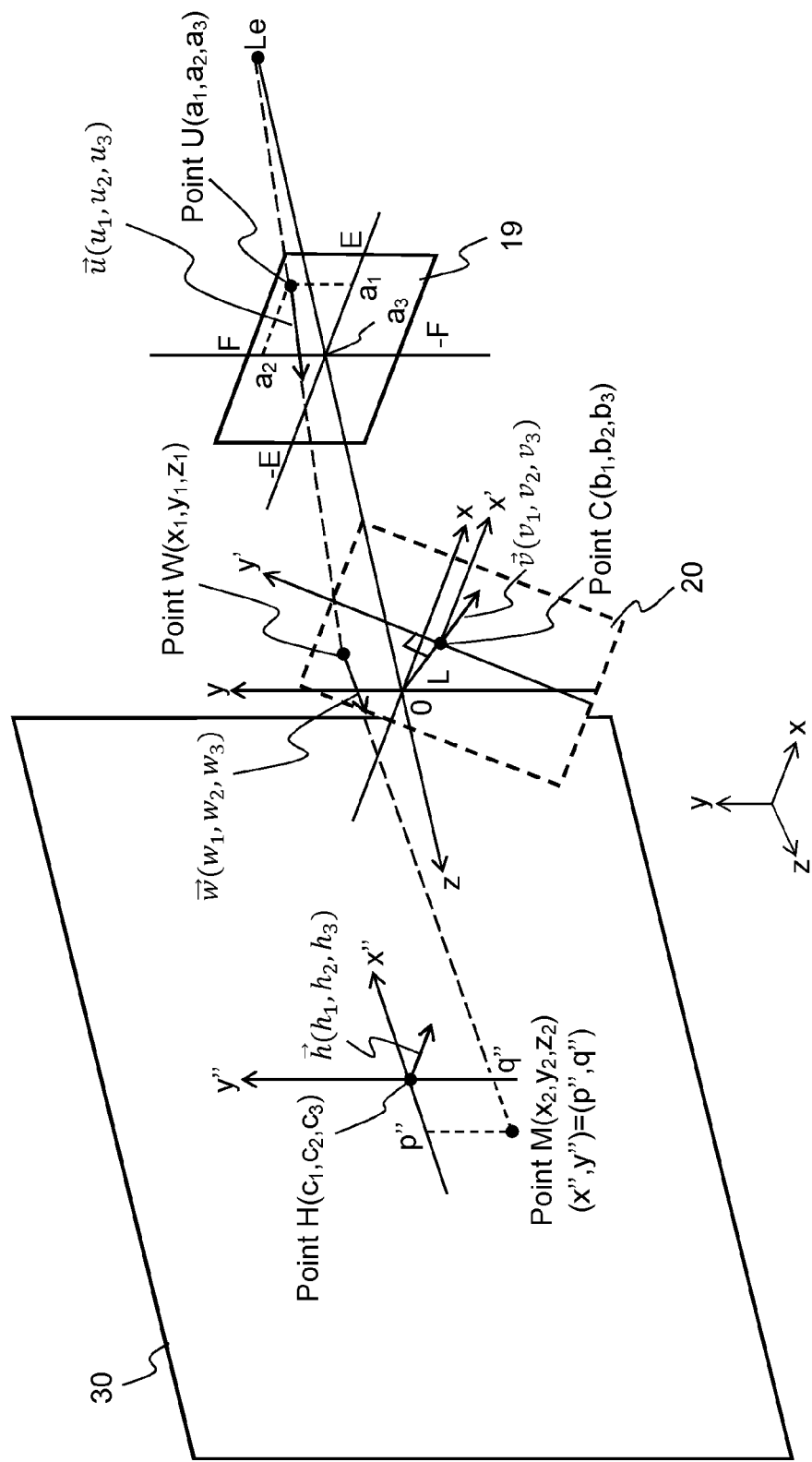
FIG. 8 shows the projector apparatus, the mirror, the position of projection image to be projected onto the projection plane, vectors, and coordinates in accordance with the first exemplary embodiment.
Figure 9:
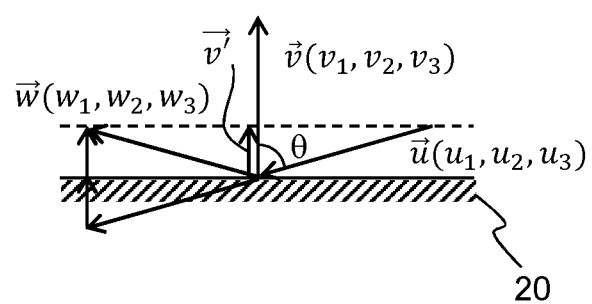
FIG. 9 shows a vector of mirror reflection in accordance with the first exemplary embodiment.

Hereinafter, the first condition used in step S43 and the second condition used in step S45 will be described. FIG. 8 shows a position of projection image, vectors, and coordinates when the projection image in rectangular projection range 19 located on front plane 18 of projector apparatus 10 reflects off mirror 20 and is projected onto projection plane 30.

Specifically, point U (a1, a2, a3) in projection range 19 is projected, in a direction of projection vector u (u1, u2, u3), to mirror 20 disposed at a position of t times as far as projection vector u. Mirror 20 is inclined; accordingly, normal vector v (v1, v2, v3) of mirror 20 is inclined to projection vector u. The projection image from point U is reflected at point W (x1, y1, z1) on mirror 20 in a direction of reflection vector w (w1, w2, w3) and is projected onto point M (x2, y2, z2) on projection plane 30.

The x-y-z coordinate system of FIG. 8 is the same as those of FIG. 2 and FIG. 4. The x'-y'-z' coordinate system, which is the coordinate system on the plane of mirror 20, is located at a position away by distance L from point 0 (as the origin of the x-y-z coordinate system). That is, mirror 20 is disposed at a position away by distance L from tilt rotation shaft 24. The x"-y"-z" coordinate system is the coordinate system on projection plane 30. The origin of the coordinate system is coordinate data point H (c1, c2, c3) on projection plane 30 detected by position detector 12. The z"-axis is defined as normal vector h (h1, h2, h3) on projection plane 30 detected by position detector 12. In the first exemplary embodiment, for the sake of simplicity, the y"-axis is described that it is parallel to the y-axis.

Point W (x1, y1, z1) is represented by Expression 1.

$$(x_1, y_1, z_1) = (a_1 + tu_1, a_2 + tu_2, a_3 + tu_3) \quad \text{[Expression 1]}$$

$$t = \frac{(v_1 b_1 + v_2 b_2 + v_3 b_3) - (a_1 v_1 + a_2 v_2 + a_3 v_3)}{u_1 v_1 + u_2 v_2 + u_3 v_3}$$

Reflection vector w (w1, w2, w3), which is projection vector u reflected from mirror 20, is represented by Expression 2 (where, vector v' is vertical to mirror 20 and it is the cosine component of projection vector u).

$$\vec{w} = \vec{u} + 2\vec{v'}$$

[Expression 2]

where, $\vec{v'} = \vec{U} \cos\theta$

From the expressions above, w1, w2, and w3 are represented by Expression 3.

$$w_1 = u_1 - 2u_1v_1^2 - 2u_2v_1v_2 - 2u_3v_1v_3$$

$$w_2 = u_2 - 2u_1v_1v_2 - 2u_2v_2^2 - 2u_3v_2v_3$$

$$w_3 = u_3 - 2u_1v_1v_3 - 2u_2v_2v_3 - 2u_3v_3^2 \quad \text{[Expression 3]}$$

Next, the method of calculating normal vector v (v1, v2, v3) of mirror 20 and point C (b1, b2, b3) are described with reference to FIG. 10.

Figure 10:
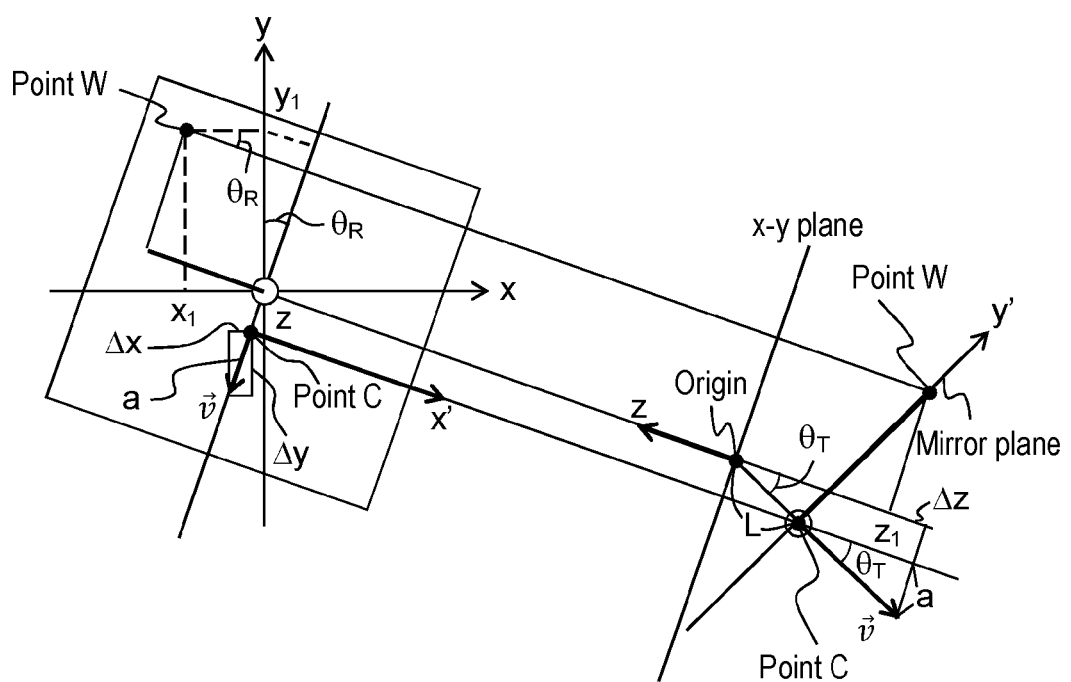
FIG. 10 shows how to calculate the normal vector in accordance with the first exemplary embodiment.

FIG. 10 illustrates the amount of tilt of mirror 20, based on tilt-movement angle θT and roll-movement angle θR of mirror 20.

Therefore, normal vector v (v1, v2, v3) is represented by Expression 4.

$$\vec{v}(v_1, v_2, v_3) = (-\sin\theta_R \sin\theta_T, -\cos\theta_R \sin\theta_T, -\cos\theta_T) \quad \text{[Expression 4]}$$

Point C (b1, b2, b3) is represented by Expression 5.

$$(b_1, b_2, b_3) = (-L\sin\theta_T \sin\theta_R, -L\sin\theta_T \cos\theta_R, -L\cos\theta_T) \quad \text{[Expression 5]}$$

Figure 11:
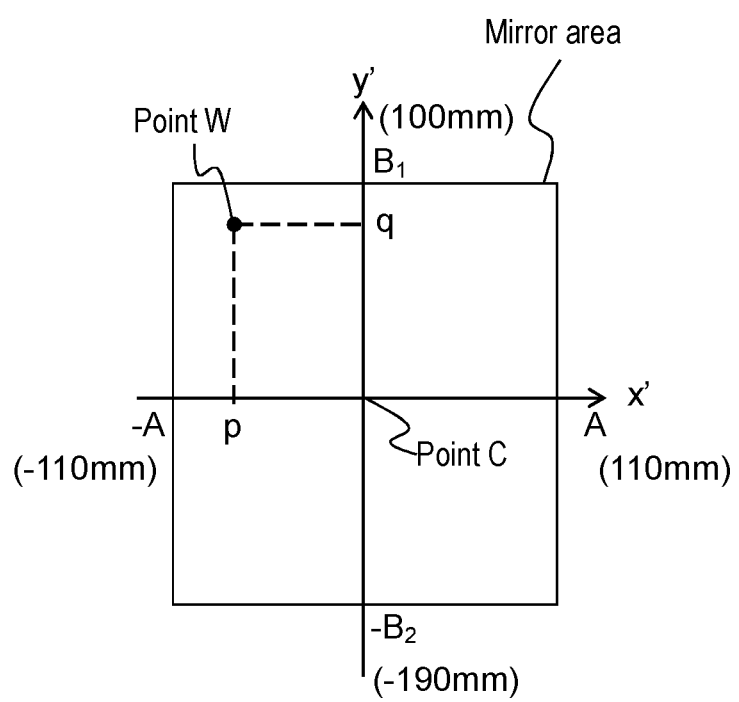
FIG. 11 shows a position of a point on the mirror in accordance with the first exemplary embodiment.

Further, as shown in FIG. 11, when the position of point W on the x'-y' plane of mirror 20 is defined as (x', y')=(p, q), p and q are represented by Expression 6.

$$p = x_1 \cos\theta_R - y_1 \sin\theta_R$$

$$q = L\tan\theta_T - \frac{Z_1}{\sin\theta_T} - \frac{L}{\cos\theta_T \sin\theta_T} \quad \text{[Expression 6]}$$

Now, suppose that, as shown in FIG. 11, the area of mirror 20 is formed of a side with a length from −A to A in the x'-axis direction, and a side with a length from −B2 to B1 in the y'-axis direction. Considering that point W is on the plane of mirror 20, reflection range 32 of mirror 20 is represented by Expression 7.

$$|p| \leq A \text{ and } -B_2 \leq q \leq B_1 \quad \text{[Expression 7]}$$

Expression 7 obtained above is the first condition employed in step S43 shown in FIG. 5.

Mirror 20 is shaped into a rectangular in the first exemplary embodiment, but it is not limited to; mirror 20 may be an oval, a trapezoid, or may be a shape with the corners chamfered. In that case, too, a conditional expression that holds for (x', y')=(p, q) on the plane of mirror 20 is determined.

Next, the expression that represents the second condition used in step S45 will be described below.

Point M (x2, y2, z2) on projection plane 30 is represented by Expression 8.

$$(x_2, y_2, z_2) = (x_1 + sw_1, y_1 + sw_2, z_1 + sw_3) \quad \text{[Expression 8]}$$

As shown in FIG. 8, when the coordinate of point M (x2, y2, z2) on the x"-y" plane is defined as (x", y")=(p", q") and the angle which the z-axis makes with the x"-axis is defined as angle θM, p" and q" are represented by Expression 9.

$$p'' = \frac{c_1 - x_2}{\sin\theta_M} \quad q'' = y_2 - c_2 \quad \text{[Expression 9]}$$

-continued $$t = \frac{(h_1c_1 + h_2c_2 + h_3c_3) - (h_1x_1 + h_2y_1 + h_3z_1)}{h_1w_1 + h_2w_2 + h_3w_3}$$

Therefore, when the coordinate of point M on the x"-y" plane, i.e., coordinate (p", q") is located in image range 31 on projection plane 30 (that will be described later), the projection image is to be projected.

Figure 12:
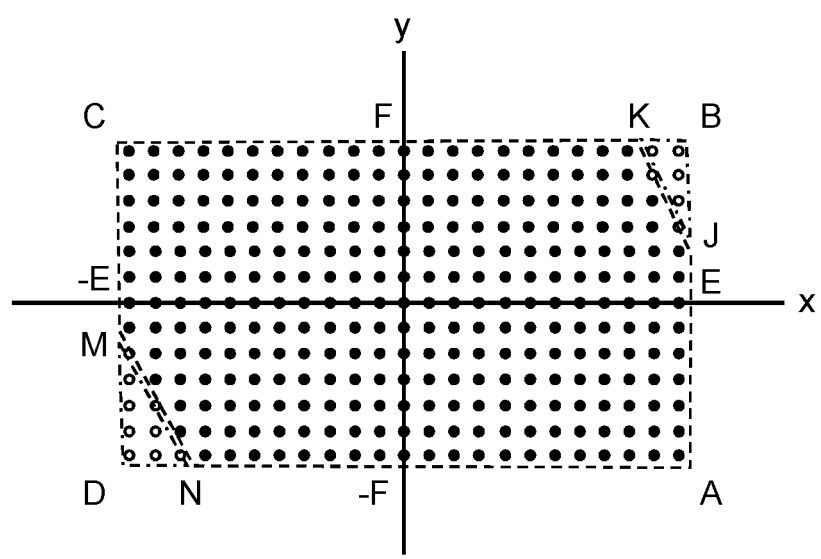
FIG. 12 shows a projection range on the front plane of the projector apparatus in accordance with the first exemplary embodiment.
Figure 13:
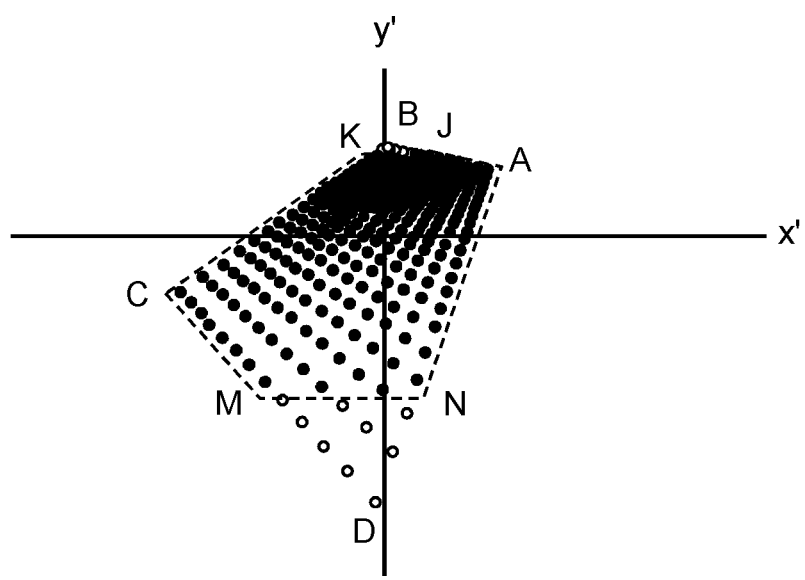
FIG. 13 shows the reflection range of the mirror in accordance with the first exemplary embodiment.
Figure 14:
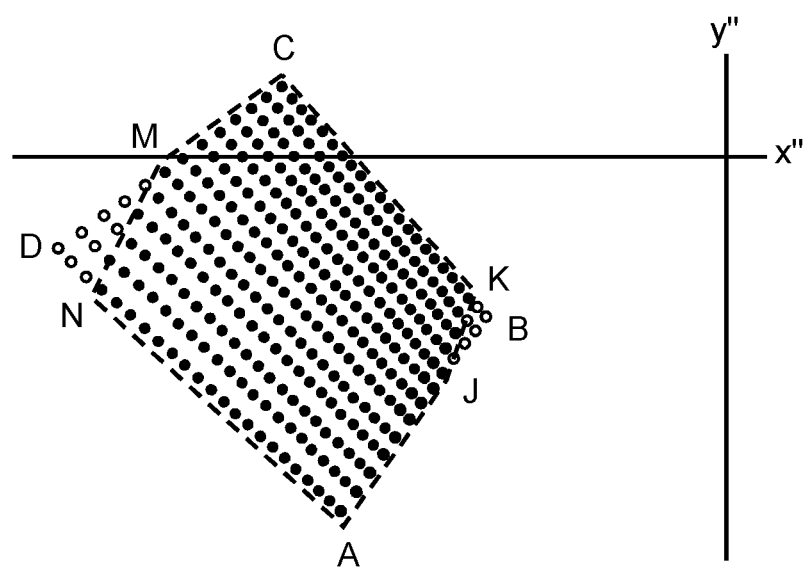
FIG. 14 shows the projection-possible range on a projection plane in accordance with the first exemplary embodiment.

Next, a method for determining image range 31 on projection plane 30 will be described with reference to FIG. 12 through FIG. 14. In the example of projection below, mirror 20 has tilt-movement angle θT of 70° and roll-movement angle θR of 60°. In FIG. 12 through FIG. 14, a black dot represents a coordinate that satisfies the first condition, whereas a white dot represents a coordinate that does not satisfy it.

FIG. 12 shows projection range 19 on front plane 18 of projector apparatus 10 of the first exemplary embodiment. The area of triangle BJK and the area of triangle DMN do not satisfy the first condition—they are reflection-impossible ranges by mirror 20. That is, the projection-possible range of projector 11 is the hexagonal-shaped area AJKCMN.

FIG. 13 shows reflection range 32 of mirror 20, i.e., shows the range of reflection positions of mirror 20 corresponding to projection range 19 shown in FIG. 12. Mirror 20 employed in the first embodiment has the following dimensions: A=110 mm; B1=100 mm; B2=190 mm (see FIG. 11). The area of triangle BJK and the area of triangle DMN do not satisfy the first condition, that is, they are reflection-impossible ranges by mirror 20. The hexagonal-shaped area AJKCMN, which satisfies the first condition, corresponds to reflection range 32 of mirror 20 shown in FIG. 6.

FIG. 14 shows projection-possible range 34 on projection plane 30 of the first exemplary embodiment, i.e., shows the range of the projection position on projection plane 30 corresponding to projection range 19 shown in FIG. 12. In FIG. 14, too, the area of triangle BJK and the area of triangle DMN do not satisfy the first condition. That is, since they are reflection-impossible ranges of mirror 20, image from projection range 19 does not reach projection plane 30. Of projection range 19 represented by rectangular ABCD shown in FIG. 12, the range that can reach projection plane 30 is hexagonal-shaped area AJKCMN, which corresponds to projection-possible range 34 shown in FIG. 7.

In the embodiment, first, projection-possible range 34 containing images that can reach projection plane 30 is calculated, and then image range 31 is determined. The method for determining image range 31 on projection range 30 will be described below.

First, the range that satisfies the first condition on projection plane 30 (i.e., the inside area of hexagon AJKCMN) is determined as an expression; to be specific, the inequality sign of each side of the hexagon is determined.

Figure 15:
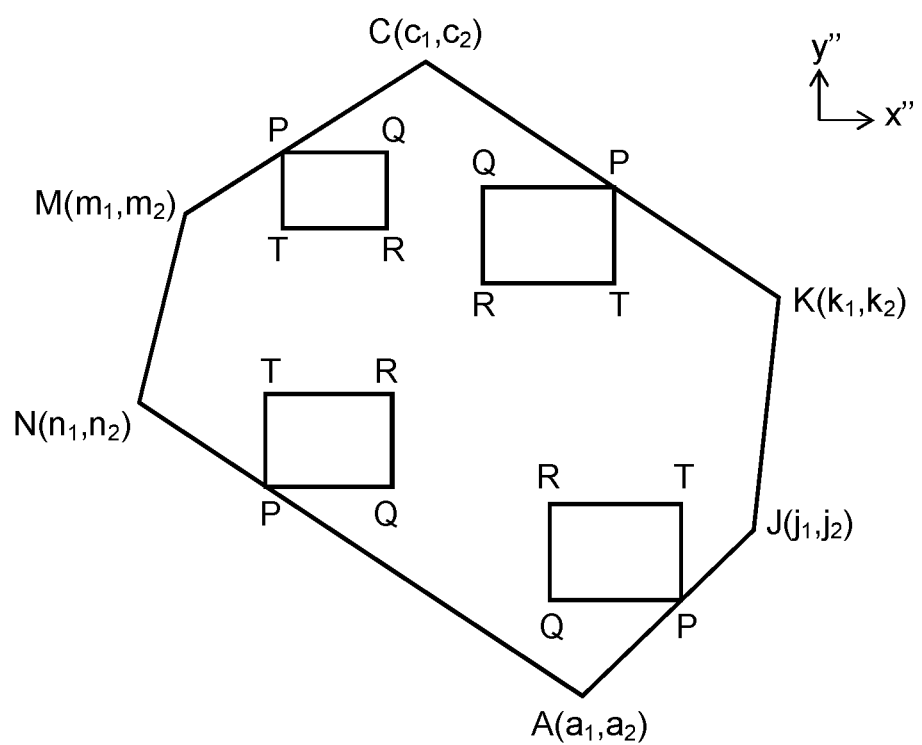
FIG. 15 shows a method for obtaining the projection range of the maximum size in accordance with the first exemplary embodiment.

When the coordinates of the vertices of hexagon AJKCMN are defined as shown in FIG. 15, for example, line AJ of side AJ is expressed by Expression 10.

$$y'' = a_2 = \frac{a_2 - j_2}{a_1 - j_1}(x'' - a_1) \quad \text{[Expression 10]}$$

The range that satisfies the first condition is, for example, in the direction where point C (c1, c2) is located, not point A or point J. Specifically, the inequality sign of Expression 11 is determined.

$$c_2 - a_2 \geq \frac{a_2 - j_2}{a_1 - j_1}(c_1 - a_1) \qquad \text{[Expression 11]}$$

As for side AJ, Expression 12 is the conditional expression that determines whether a point on the x"-y" plane satisfies the first condition or not. Similarly, as for side JK, side KC, side CM, side MN, and side NA, the expressions from 13 to 17 are the conditional expressions that determine a point satisfies the first condition or not.

$$y'' - a_2 \geq \frac{a_2 - j_2}{a_1 - j_1}(x'' - a_1) \qquad \text{[Expression 12]}$$

$$y'' - j_2 \geq \frac{j_2 - k_2}{j_1 - k_1}(x'' - j_1) \qquad \text{[Expression 13]}$$

$$y'' - k_2 \leq \frac{k_2 - c_2}{k_1 - c_1}(x'' - k_1) \qquad \text{[Expression 14]}$$

$$y'' - c_2 \leq \frac{c_2 - m_2}{c_1 - m_1}(x'' - c_1) \qquad \text{[Expression 15]}$$

$$y'' - m_2 \leq \frac{m_2 - n_2}{m_1 - n_1}(x'' - m_1) \qquad \text{[Expression 16]}$$

$$y'' - n_2 \geq \frac{n_2 - a_2}{n_1 - a_1}(x'' - n_1) \qquad \text{[Expression 17]}$$

That is, a point that satisfies all of expression 12 through 17 satisfies the first condition.

Further, according to the first embodiment, the range that is the same in aspect ratio as projection range 19 and has the maximum area is determined as image range 31, which will be described below.

According to the first embodiment, calculation to obtain the maximum area of image range 31 is performed on the supposition that point P is located on each side, as shown in FIG. 15, and point Q, point R, and point T are determined so as to form a rectangular having an aspect ratio the same as projection range 19. The method determines whether point P, point Q, point R, and point T of each rectangular satisfies all of the expressions from 12 through 17 or not.

According to the direction of an inequality sign and positive/negative inclination of each side, point Q, point R, and point T with respect to point P have four different positions.

Specifically, in the case of point P on side AJ, the positive direction of the y"-axis satisfies the first condition and side AJ has a positive slope; point Q is positioned in the negative direction of the x"-axis beyond point P, and point T is positioned in the positive direction of the y"-axis beyond point P. Similarly, in the case of point P on side JK, the positive direction of the y"-axis satisfies the first condition and side JK has a positive slope; point Q is positioned in the negative direction of the x"-axis beyond point P, and point T is positioned in the positive direction of the y"-axis beyond point P.

In the case of point P on side KC, the negative direction of the y"-axis satisfies the first condition and side KC has a negative slope; point Q is positioned in the negative direction of the x"-axis beyond point P, and point T is positioned in the negative direction of the y"-axis beyond point P.

In the case of point P on side CM, the negative direction of the y"-axis satisfies the first condition and side CM has a positive slope; point Q is positioned in the positive direction of the x"-axis beyond point P, and point T is positioned in the negative direction of the y"-axis beyond point P.

In the case of point P on side MN, the negative direction of the y"-axis satisfies the first condition and side MN has a positive slope; point Q is positioned in the positive direction of the x"-axis beyond point P, and point T is positioned in the negative direction of the y"-axis beyond point P.

In the case of point P on side NA, the positive direction of the y"-axis satisfies the first condition and side NA has a negative slope; point Q is positioned in the positive direction of the x"-axis beyond point P, and point T is positioned in the positive direction of the y"-axis beyond point P.

With respect to point P on each side, point Q, point R, and point T are positioned so that the area of the rectangular gradually increases. In this way, the maximum area that satisfies all the expressions from 12 through 17 can be determined.

The maximum area can be determined, for example, by moving point P on side AJ by Δx and increasing area S by Δd each time point P is moved. In the first exemplary embodiment, projection range 19 has an aspect ratio of 16 to 9. Like in side AJ, the calculation is performed on side JK, side KC, side CM, side MN, and side NA so as to find the maximum area and the positions of point P, point Q, point R, and point T at which the maximum area is obtained.

With the method described above, image range 31 shown in FIG. 7 is calculated.

Further, whether a check point belongs to image range 31 or not is determined by the second condition. If it satisfies, projector apparatus 10 projects an image that corresponds to the check point.

Figure 16:
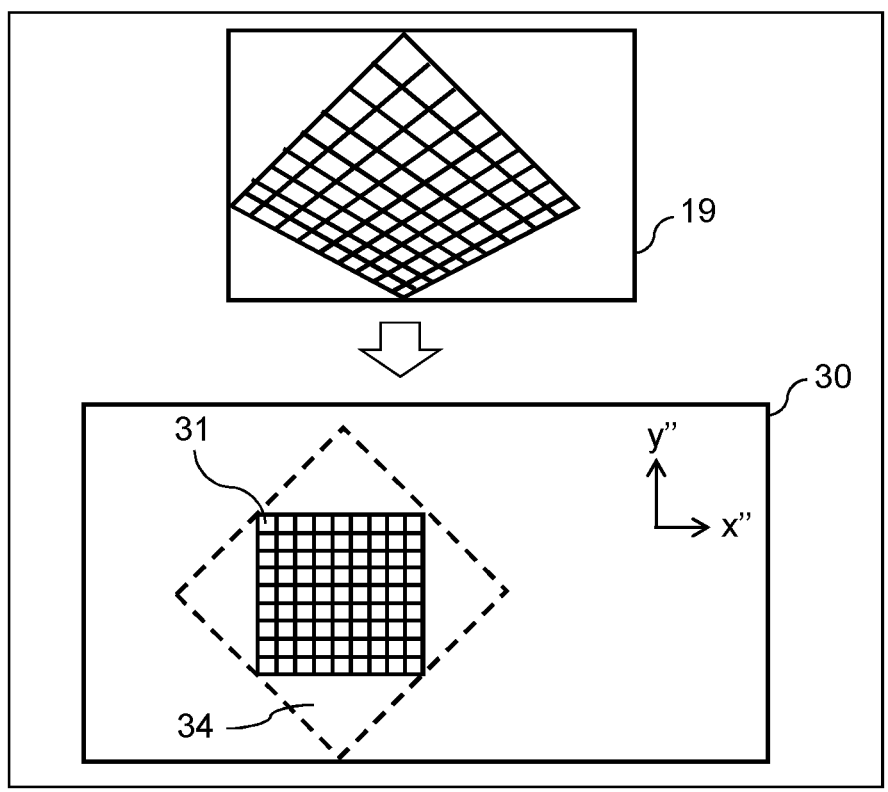
FIG. 16 shows an image seen on the front plane of the projector apparatus and the image projected on the projection plane in accordance with the first exemplary embodiment.

FIG. 16 shows an image seen on front plane 18 of projector apparatus 10 and the image projected on projection plane 30 of the first exemplary embodiment. To project projection image (image range 31) with no distortion on projection plane 30, the image on projection range 19 shown in FIG. 16 has been corrected by calculator 14 so that a distortion component due to the reflection of mirror 20 is eliminated.

With the structure above, a reflection-possible range by a mirror can be calculated in advance so that projection image is set in the range. This allows image to be projected extensively in directions with no need for using a large-sized mirror.

In the description of the embodiment, the projection image has a rectangular shape, but it is not limited to; for example, the projection image may have a round or an oval shape.

Although a zoom position of the projection lens is not mentioned in the description of the embodiment, the zoom position may be changed for an effective use of projection range 19. For example, as for the determination that a non-reflection range by mirror 20 is large, moving the zoom position in the direction of the telescope side decreases the non-reflection range. As another measure, a convergence lens may be disposed between projector apparatus 10 and mirror 20 so as to reduce in size the image projected by projector apparatus 10.

In the embodiment, image range 31 is defined to have the maximum size within the projection-possible range on projection plane 30, but it is not limited to; image range 31 may be determined to be smaller than the maximum-sized range.

Besides, the projection range may be determined to have a round, an oval, or any other shapes as usage.

In the embodiment, the data on projection plane 30 is detected by position detector 12, but it is not limited to. When projector apparatus 10 is used at a fixed position, the data on projection plane 30 may be retained in advance by recorder 13 of projector apparatus 10.

In the embodiment, the y"-axis of projection plane 30 is defined to be parallel to the y-axis of projection range 19, but it is not limited to; it may be determined in any given direction, unless it provides the viewers with a "something-is-wrong" feeling. For example, the axis of the projection image in the up-to-down direction may be determined to have an inclination in the range from −5° to 5° to the vertical direction. In that case, calculator 14 calculates image range 31 so as to have the maximum size of a predetermined shape within the projection-possible range on projection plane 30 under the condition that the axis of the projection image in the up-to-down direction has an inclination in the range from −5° to 5° to the vertical direction.

Although the image to be projected on projection plane 30 has no inclination in the description, the image to be projected on the projection plane may have a predetermined inclination angle.

Further, in the embodiment, the projection lens has no lens shifting, that is, the projecting direction is defined to be symmetry to the optical axis, but it is not limited to; the projection lens may have lens shifting.

Second Exemplary Embodiment

In the first exemplary embodiment, as shown in FIG. 5, each point of the entire area of projection range 19 is checked for whether it satisfies the first condition or not. In the second exemplary embodiment, however, only the points located on the outline of projection range 19 are checked, and a range formed by connecting the points that satisfy the first condition is determined as the range that satisfies the first condition. The in-detail procedures are shown in FIG. 17.

Figure 17:
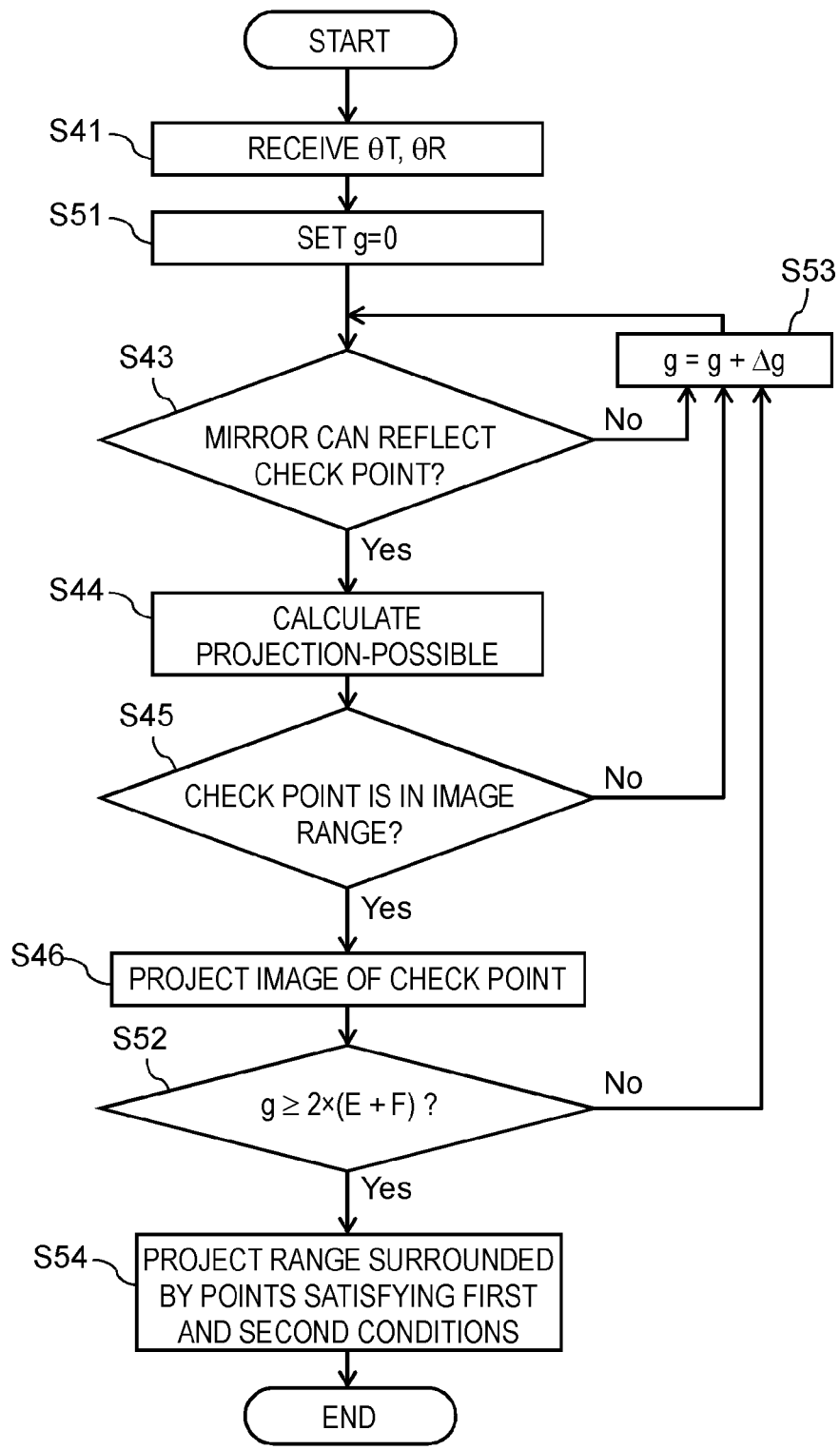
FIG. 17 is a flowchart illustrating the projection procedures of a projector system in accordance with a second exemplary embodiment.

FIG. 17 is a flowchart illustrating the projection procedures—in which the points in projection range 19 shown in FIG. 4 are checked for whether they satisfy the first condition or not—of projector system 1 of the second exemplary embodiment. After receiving tilt-movement angle θT and roll-movement angle θR in step S41, controller 15 defines a certain point located on the outline of projection range 19 as the starting point of the check points, and check distance g is set to 0 in step S51. After performing the steps from S43 through S46 as in FIG. 5, in step S52, controller 15 determines whether check distance g is not less than the length of the outline of projection range 19 represented by the expression: 2×(E+F).

If check distance g is smaller than the length of the outline (i.e., in the case of 'No' in step S52), check increment Δg is added to check distance g in step S53 and the procedure goes back to step S43. If check distance g is not less than the length of the outline (i.e., in the case of 'Yes' in step S52), an image, which corresponds to all the points contained in the range surrounded by the check points that satisfy the first condition and the second condition, is projected on the projection plane in step S54.

Performing the procedures above brings the following result: side AJ, side KC, side CM, and side NA shown in FIG. 12 satisfy the first condition. When point J and point K are connected to form side JK, and point M and point N are connected to form side MN, hexagon AJKCMN formed by the two sides and the aforementioned four sides is the range that satisfies the first condition. In FIG. 14, too, the range that satisfies the first condition on the projection plane 30 forms hexagon AJKCMN.

In this way, only determining the outline of projection range 19 obtains hexagon AJKCMN as the range that satisfies the first condition. Compared to the procedure of FIG. 5 where the points of the entire area of projection range 19 are checked, the method of the second embodiment offers an easier and quicker determination.

INDUSTRIAL APPLICABILITY

The projector apparatus of the present disclosure provides maximum-sized projection image with no need for a large-sized mirror. This is therefore useful to a projector system.

What is claimed is:

1. A projector system comprising:
   a projector that projects an image;
   a mirror that tilts on each of intersecting two axes as an axis of rotation and reflects the image projected from the projector;
   an angle detector that detects an inclination angle of the mirror;
   a calculator that, based on the inclination angle, calculates a reflection range of the mirror, a projection range of the projector that corresponds to the reflection range, and an image range; and
   a controller that generates and arranges the image within the projection range based on the projection range, the reflection range, and image range calculated by the calculator.

2. The projector system of claim 1, wherein the calculator calculates the image range so that the projection image to be projected on a projection plane via reflection by the mirror is formed into a predetermined shape.

3. The projector system of claim 2, wherein the calculator corrects the image to eliminate a distortion caused by reflection by the mirror so that the projection image has no distortion.

4. The projector system of claim 2, further comprising;
   a position detector that detects position data on the projection plane,
   wherein, the calculator calculates the image range from the detected position data.

5. The projector system of claim 2, further comprising:
   a recorder that records position data on the projector, the mirror, and a projection plane,
   wherein, the calculator calculates the image range from the position data.

6. The projector system of claim 5, further comprising:
   an angle controller that moves the mirror for changing the inclination angle,
   wherein, in response to continuous operation of the angle controller, the angle detector continuously detects the inclination angle of the mirror, and the calculator calculates, based on the position data continuously recorded in the recorder, the image range so that the image has the predetermined shape.

7. The projector system of claim 1, wherein the calculator calculates the image range so as to be maximum in size within the projection range.

8. The projector system of claim 1, wherein the calculator calculates the image range so as to be maximum in size under a condition that an axis of the image in an up-to-down direction on the projection plane has an inclination in a range from −5° to 5° to a vertical direction.

9. The projector system of claim 1, wherein the mirror tilts to the inclination angle such that a part of the image projected from the projector is not reflected.

* * * * *